(12) United States Patent
Sarkar

(10) Patent No.: US 10,810,220 B2
(45) Date of Patent: Oct. 20, 2020

(54) PLATFORM AND SOFTWARE FRAMEWORK FOR DATA INTENSIVE APPLICATIONS IN THE CLOUD

(71) Applicant: HEWLETT PACKARD ENTERPRISE DEVELOPMENT LP, Houston, TX (US)

(72) Inventor: Sanhita Sarkar, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 601 days.

(21) Appl. No.: 15/339,186

(22) Filed: Oct. 31, 2016

(65) Prior Publication Data

US 2017/0109415 A1   Apr. 20, 2017

Related U.S. Application Data

(63) Continuation of application No. 14/266,764, filed on Apr. 30, 2014, now Pat. No. 9,513,934.

(60) Provisional application No. 61/818,288, filed on May 1, 2013, provisional application No. 61/841,262, filed on Jun. 28, 2013.

(51) Int. Cl.
| | |
|---|---|
| *G06F 9/46* | (2006.01) |
| *G06F 16/248* | (2019.01) |
| *G06F 16/25* | (2019.01) |
| *H04L 12/26* | (2006.01) |
| *G06F 9/445* | (2018.01) |

(52) U.S. Cl.
CPC ............ *G06F 16/248* (2019.01); *G06F 9/445* (2013.01); *G06F 9/46* (2013.01); *G06F 16/25* (2019.01); *H04L 43/00* (2013.01); *H04L 43/045* (2013.01); *H04L 43/0817* (2013.01); *H04L 43/50* (2013.01); *G06F 16/258* (2019.01)

(58) Field of Classification Search
CPC ........................................................ G06F 9/46
See application file for complete search history.

(56) References Cited

U.S. PATENT DOCUMENTS 9,170,912 B1   10/2015   Hu et al.
9,513,934 B2   12/2016   Sarkar
(Continued)

OTHER PUBLICATIONS

U.S. Appl. No. 14/266,764 Final Office Action dated Jul. 12, 2016.
U.S. Appl. No. 14/266,764 Office Action dated Dec. 18, 2015.

*Primary Examiner* — Charlie Sun
(74) *Attorney, Agent, or Firm* — Hewlett Packard Enterprise Patent Department

(57) ABSTRACT

A system deploys visualization tools, business analytics software, and big data software in a multi-instance mode on a large, coherent shared memory many-core computing system. The single machine solution provides or high performance and scalability and may be implemented remotely as a large capacity server (i.e., in the cloud) or locally to a user. Most big data software running in a single instance mode has limitations in scalability when running on a many-core and large coherent shared memory system. A configuration and deployment technique using a multi-instance approach, which also includes visualization tools and business analytics software, maximizes system performance and resource utilization, reduces latency and provides scalability as needed, for end-user applications in the cloud.

13 Claims, 7 Drawing Sheets

(56) References Cited

U.S. PATENT DOCUMENTS

| | | | |
|---|---|---|---|
| 2005/0010728 A1* | 1/2005 | Piry | G06F 12/0831 |
| | | | 711/147 |
| 2009/0055834 A1 | 2/2009 | Ding et al. | |
| 2009/0182866 A1* | 7/2009 | Watanabe | G06F 11/3495 |
| | | | 709/224 |
| 2010/0205604 A1 | 8/2010 | Brower et al. | |
| 2013/0187926 A1 | 7/2013 | Silverstein et al. | |
| 2014/0075571 A1* | 3/2014 | Jackson | G06F 21/6227 |
| | | | 726/28 |
| 2014/0250153 A1 | 9/2014 | Nixon et al. | |
| 2014/0282581 A1 | 9/2014 | Vonteddu | |
| 2014/0330851 A1 | 11/2014 | Sarkar | |

\* cited by examiner

PLATFORM AND SOFTWARE FRAMEWORK FOR DATA INTENSIVE APPLICATIONS IN THE CLOUD

CROSS REFERENCE TO RELATED APPLICATIONS

This application is a continuation and claims the priority benefit of U.S. patent application Ser. No. 14/266,764 filed Apr. 30, 2014, which claims the priority benefit of U.S. Provisional Patent Application No. 61/818,288 filed May 1, 2013, and the priority benefit of U.S. Provisional Application No. 61/841,262 filed Jun. 28, 2013, the disclosures of which are incorporated herein by reference.

BACKGROUND

1. Field of the Invention

The present invention generally relates to executing application software that process big data. More specifically, the present invention relates to implementing big data software in a single multi-instance node.

2. Description of the Related Art

Applications software that process big data tend to stress system resources with a large load. To deal with this, big data applications are often run on multiple machines. When multiple copies of big data software are running on multiple machines, they can process large amounts of data more quickly than only one such machine.

Processing big data on multiple machines has disadvantages. When multiple machines execute multiple copies of big data software, the software copies often need to communicate with each other. These multiple machines each have an IP address and communicate over a network such as the Internet. Communication between machines over a network, wherein each machine has its own IP address, inherently will introduce delays due to network latency. Additional steps for data aggregation across the network to deliver the ultimate result to end users in the cloud, incur further delays.

FIG. 1 is a block diagram of a cluster of nodes of the prior art. The cluster of nodes includes nodes 1-6. Each node may include memory, a processor with one or more cores, and other computing components. When processing large amounts of data, a copy of a big data software application may execute on each node. Different copies of the same software may be loaded onto and executed by each node in order to achieve faster processing of large amounts of data. The nodes each have their own IP address and communicate with each other over one or more networks such as the Internet, which introduces latency in the processing of the data.

The delay in processing data and aggregating the result set by big data software for end users in the cloud degrades performance of the big data software and may even cause errors due to latency. What is needed is an improved method for processing data by big data software for end-user applications in the cloud.

SUMMARY

A system is provided for deploying visualization tools, business analytics software, and big data software in a multi-instance mode on a large, coherent shared memory many-core computing system. The single machine solution provides high performance and scalability and may be implemented remotely as a large capacity server (i.e., in the cloud) or locally to a user. Most big data software running in a single instance mode has limitations in scalability when running on a many-core and large coherent shared memory system. A configuration and deployment technique using a multi-instance approach, which also includes visualization tools and business analytics software, maximizes system performance and resource utilization, reduces latency and provides scalability as needed for end-user applications in the cloud.

In embodiments, a method for visualizing data may instantiate a number of application instances on a multi-core single machine. Analytics may be performed by one or more of the application instances on data from a database implemented on the single machine. Visualization data may be provided based on the analytics by a visualization application implemented on the same machine.

A multi-core single machine for visualizing data may include a processor, memory, and one or more modules stored in memory. The one or more modules may be executable by the processor to instantiate a number of application instances on the multi-core single machine, perform analytics by one or more of the application instances on data from a database implemented on the single machine, and provide visualization data based on the analytics by a visualization application implemented on the same machine.

DETAILED DESCRIPTION

The present system provides for deploying visualization tools, business analytics software, and big data software in a multi-instance mode on a large, coherent shared memory many-core computing system. The single machine solution provides high performance and scalability and may be implemented remotely as a large capacity server (i.e., in the cloud) or locally to a user. Most big data software running in a single instance mode has limitations in scalability when running on a many-core and large coherent shared memory system. A configuration and deployment technique using a multi-instance approach, which also includes visualization tools and business analytics software, maximizes system performance and resource utilization, reduces latency and provides scalability as needed by end-user applications in the cloud.

Figure 1:
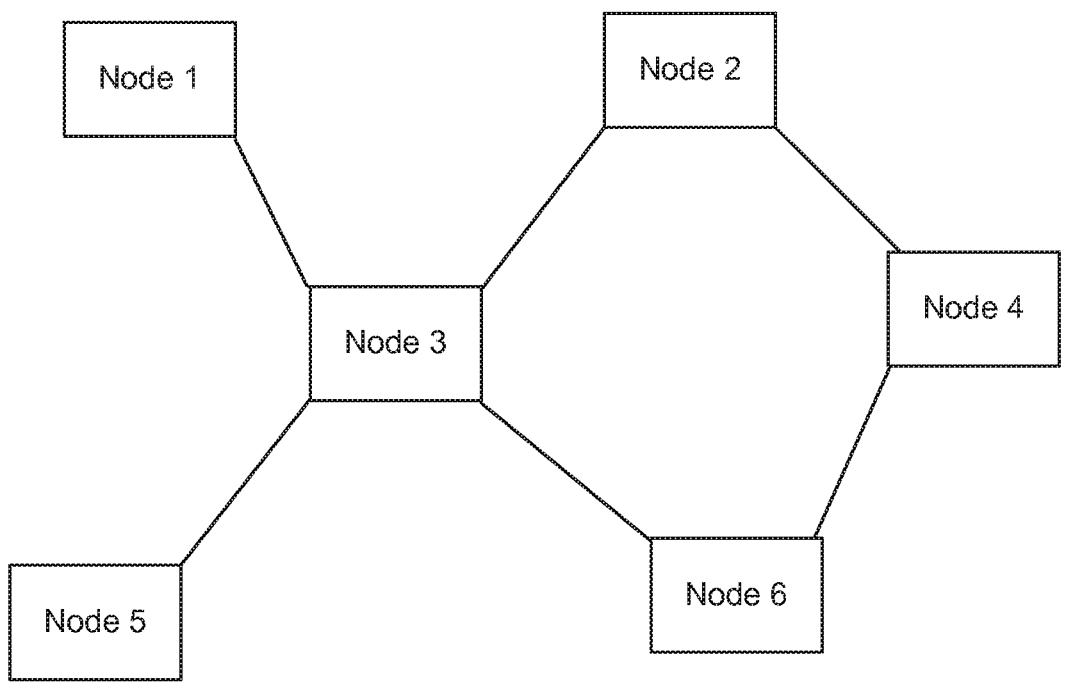
FIG. 1 is a block diagram of a cluster of nodes of the prior art.
Figure 2:
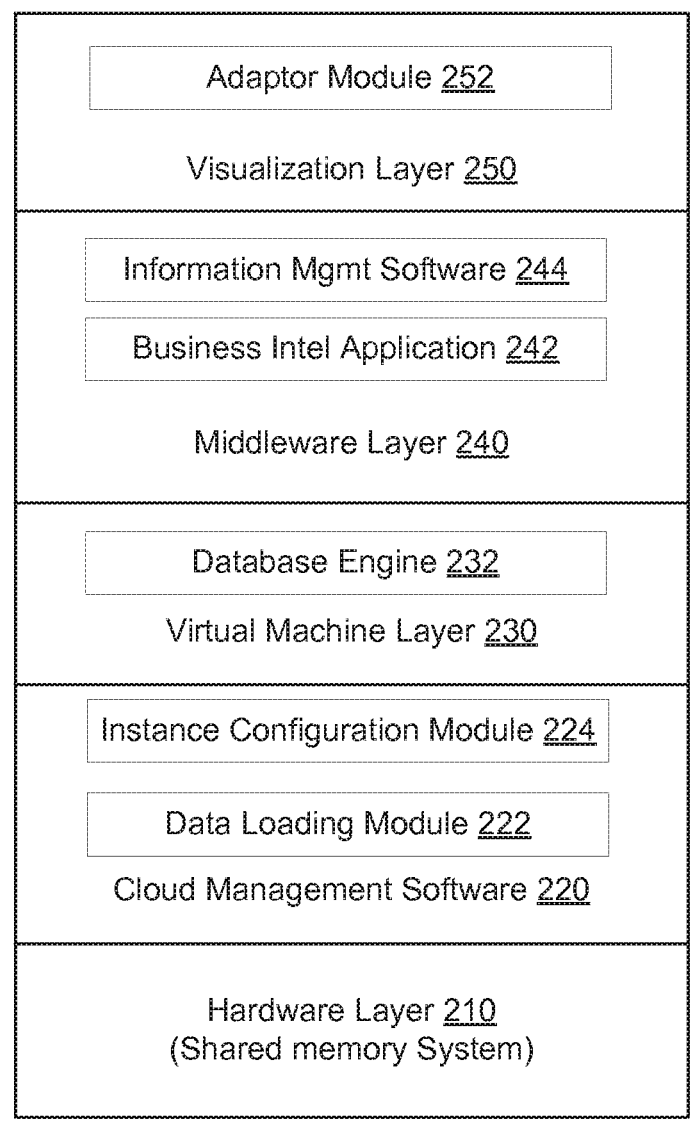
FIG. 2 is a block diagram of a machine having a many-core shared memory system, business layer, and visualization layer.

FIG. 2 is a block diagram of a machine having a many-core shared memory system, business layer, and visualization layer. The single machine 200 of FIG. 2 includes hardware layer 210, cloud management software 220, virtual machine layer 230, middleware 240 and visualization layer 250. The hardware layer 210 may include many cores and a shared memory system. The many core shared memory system may be configured to receive and execute multiple instances of client applications, for example on cloud management software 220.

Cloud management software 220 may include software for configuring application instances and ingesting data for one or more of the application instances. Instance configuration module 224 may be executed to configure application instances on machine 200. Data loading module 22 may be executed to ingest large amounts of data in parallel on machine 200. Configuring application instances and ingestion of data is discussed in more detail below with respect to FIGS. 4 and 5.

Virtual machine layer 230 may implement one or more virtual machines on machine 200. The virtual machine engine 230 may include a database engine 232, which may be implemented as a graph database. The graph database may manage data that can be accessed by one or more client applications for analytics and eventual visualization.

Middleware layer 240 may include one or more client applications that access data from database engine 232, perform analytics on the data, and provide data for visualization to visualization layer 250. In some embodiments, middleware layer 240 may include information management software 244 and business intelligence application 242. Software 244 and 242 may collectively provide an application server and framework for use for enterprise and web development, message queuing, memory management for concurrent users, security, and container management. The software may also include an open source library for in-database analytics over unstructured and structured data, an open source mining framework with data extracted from a backend database, and an open source in-memory complex event processing (CEP) engine to process machine generated/sensor data.

Visualization layer 250 may receive one or more data streams from one or more applications of the middleware layer and provide visualization data based on the received data. Visualization layer may include adaptor module 252. The adaptor module may be used to adapt data received from multiple data sources in a variety of formats and adapt the data to a particular format. By adapting the data to a single format, data from a plurality of sources and business sectors may be visualized.

The machine 200 of FIG. 2 provides a software development framework implemented on a large, coherent shared memory system enabled over a network (i.e., in the "cloud"). The implementation may use a kernel based virtual machine (KVM) and be supported by cloud management software. Multiple virtual machines of large sizes may be created as a process for efficiently provisioning resources of the large, coherent shared memory system. One or more applications that run on multiple virtual machines of the shared memory system "in the cloud" may be able to efficiently leverage the resources of the shared memory system for scalability and elasticity.

Figure 3:
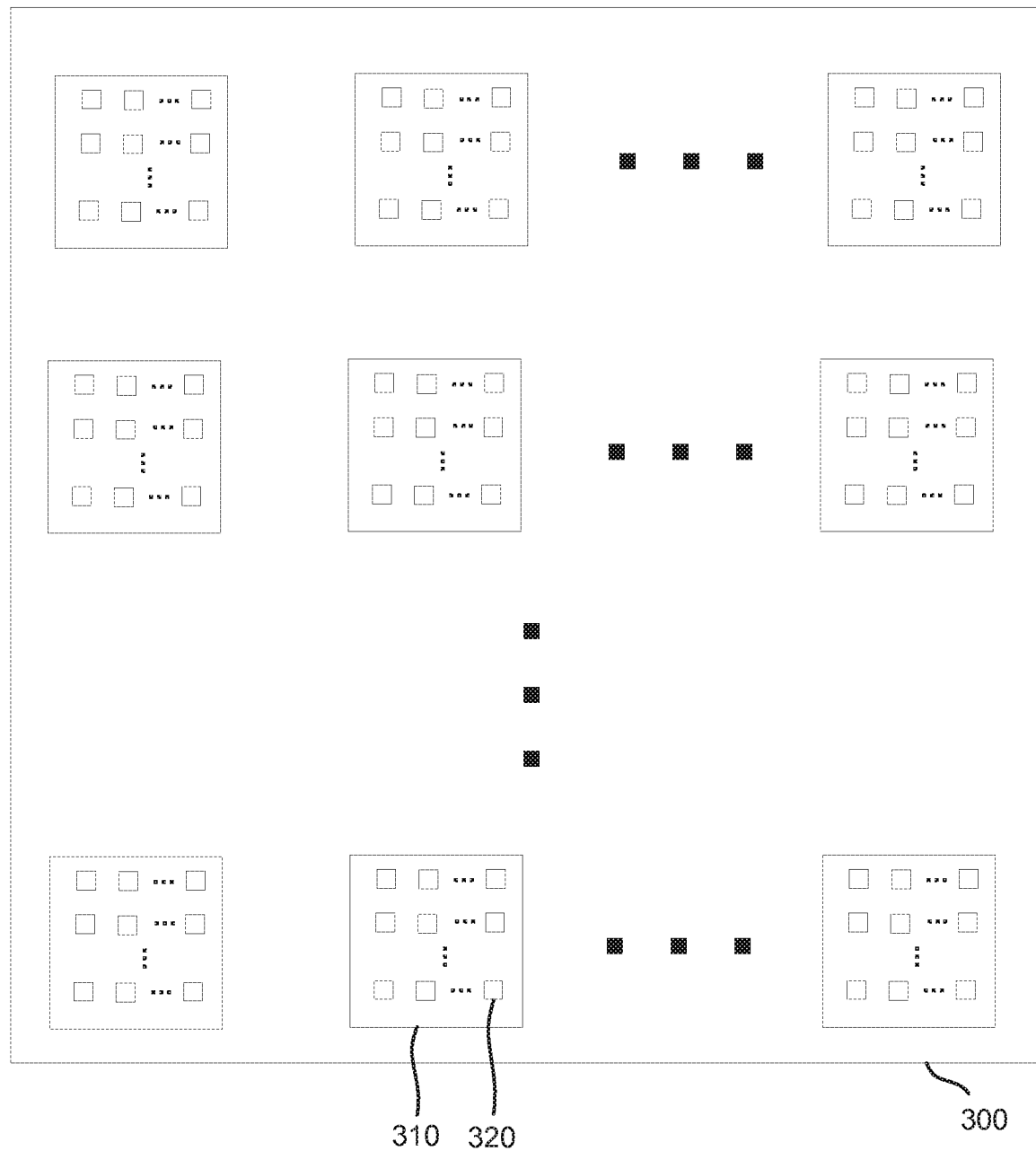
FIG. 3 is a block diagram of a system having a high number of cores.

FIG. 3 is a block diagram of a system having a high number of cores. The layers of machine 200 may be implemented on hardware such as the system of FIG. 3.

The machine 300 includes a plurality of sockets 310. Each socket may include a plurality of cores 320. For example, the system 300 may include 128 sockets, with each socket including 15 cores, for a total of 1,920 cores. The sockets may each include multiple memory DIMM slots, such as for example, 12 memory DIMM slots each populated with 32 GB DIMMs providing a total of 48 TB system memory.

The cores of each socket may be grouped into an instance which processes a software application. For example, the cores of a particular socket may form one or more instances, and cores from multiple adjacent sockets may form an instance. The instances may be formed from a number of cores and memory such that they are able to host and execute a software instance as efficiently as possible.

Figure 4:
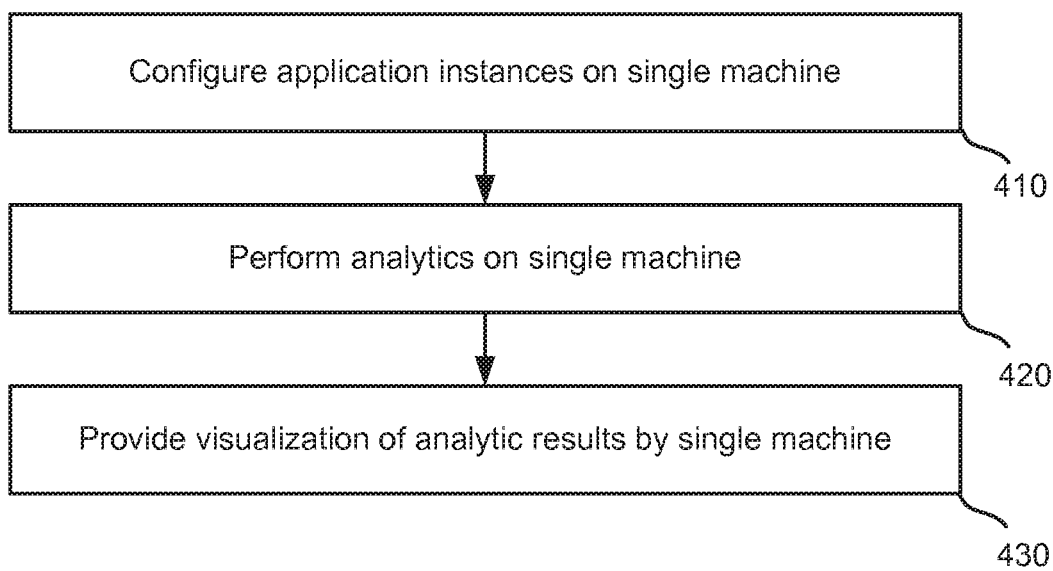
FIG. 4 is a method for configuring and providing visualization by a many-core single machine.

FIG. 4 is a method for configuring and providing visualization by a many-core single machine. Application instances may be configured on a single machine at step 410. The application instances can be configured to provide as many instances as possible and/or as needed for efficient handling of analytics. The application instances may be instantiated in the middleware layer of the single machine 200. More detail for configuring and providing visualization by a many-core single machine is discussed with respect to the method of FIG. 5.

Analytics are performed on the single machine at step 420. Once the application instances are configured and data is ingested, the client applications may perform analytics on data stored in the machine. Because the data and middleware is on the same machine, there analytics may be performed quickly and efficiently.

A visualization of the analytic results may be provided by the single machine at step 430. Once the analytics become available, a data stream may be provided to the visualization layer on the same machine on which the analytics take place. The visualization layer includes a visualization tool which may generate a graphical interface for the data.

The present system may adapt a data stream from a first format into a second format. The adapted data in the second format may be placed in a template, such as a Java template, and then accessed by the visualization tool. Because the visualization is provided by the same machine as the analytics software and application instances, the visualization may be performed quickly and without latency inherent in systems that have these software packages distributed over two or more machines.

The visualization may be viewed through a remote device, such as a desktop computer, workstation or a mobile device. The mobile device, such as for example a smart phone, may include an application stored and executing on the smart device and configured to receive a graphical interface generated by the visualization layer.

Figure 5:
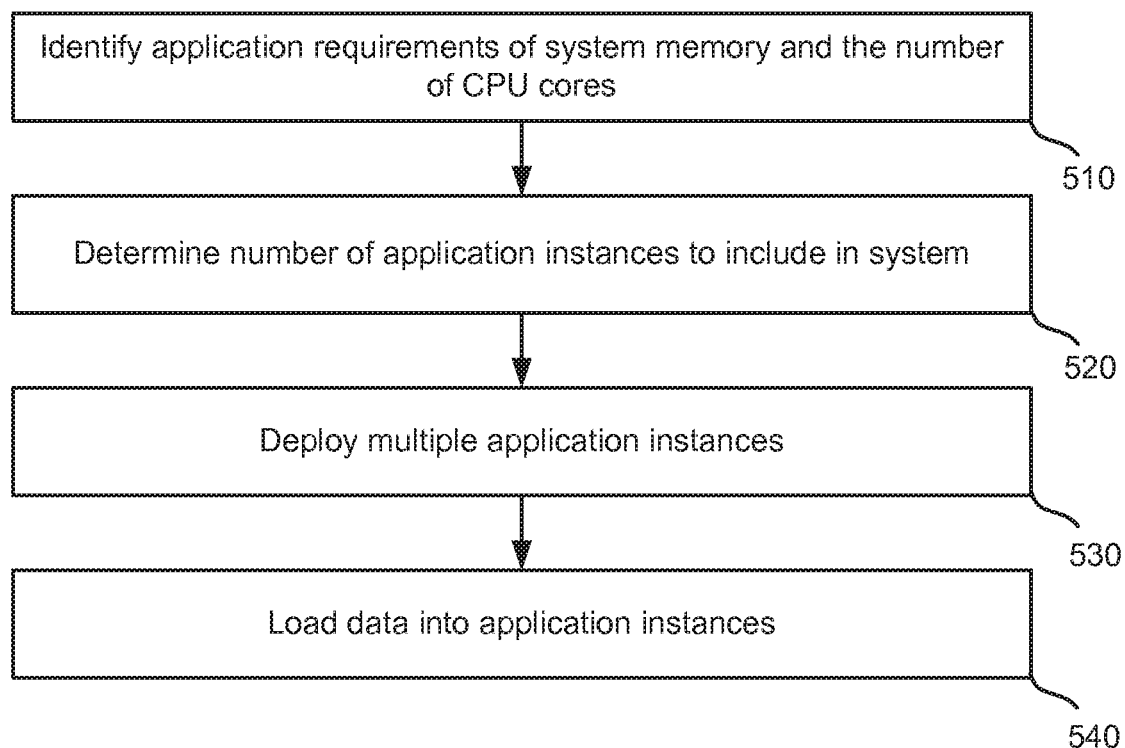
FIG. 5 is a method for deploying software in a multi-instance node.

FIG. 5 is a method for deploying software in a multi-instance node. First, application requirements of a system memory and the number of CPU cores are identified at step 510. This step may help determine whether the application is memory intensive, CPU intensive, or both.

Application requirements for memory usage may be determined by performing a test of the system on which the application instances will be deployed. An automated testing application (such as instance a configuration module), user, or combination of both may run a workload/benchmark test using a single instance of the application on a system. The test may execute for a period of time, for example an hour, until the application reaches a steady state. The memory usage may then be stored once the application has reached the steady state. For example, a benchmark application may include a UNIX system-related command such as "SAR" or other command to retrieve the memory usage at the desired state.

The number of CPU cores to utilize may be determined by performing a test of the system on which the application instances will be deployed. An automated testing application, user, or combination of both may run a workload/benchmark test using a single instance of the application system. The application may determine whether CPU usage by the instance is just above a certain threshold, such as for example above 85%. If CPU usage falls below the threshold, then more cores are being utilized then needed or desired, and the test may be repeated or continued with a lower number of cores. For example, while running the test, a command such a NUMA command may be issued to reduce the number of cores for the single application instance until the application requires 85% of the allocated cores. For instance, on a UV system with 128 cores, if 16 cores are allocated to the application instance, then CPU usage should be around 12% (out of 128 cores).

The number of application instances may be determined at steps 520. The instances may be the lesser of the ratio of total memory to memory usage and the ratio of total cores to used cores. The ratio of total memory to memory usage may be determined as the total memory in the system divided by the memory used by the application in the steady state. The core ratio may be determined by dividing the total number of cores in the system to the number of cores required to run a single application at less than a threshold value (e.g., 85%). Both ratios may be determined by an application stored in memory and executed by a processor of the present system, such as a testing application. The lesser of the two ratio values is taken as the number of application instances.

The application instances may be deployed at step 530. The application instances may be installed on the system and executed to process multiple subsets of cores and memory. In some embodiments, the multiple instances may be executed by a multi-threaded program to ensure they are started (or terminated) at about the same time when data is processed.

The instance configuration module may ensure that each instance is invoked with an allocation of cores and memory space. For example, instance configuration module 230 executing on a multi-instance computing system may issue NUMA commands to allocate the core count and memory size allocated to each instance of the application.

To optimize the performance from a single application instance, several steps may be taken by the application. For example, the cores and memory may be allocated from within the same NUMA nodes. Alternatively, the cores and memory may be allocated from adjacent NUMA nodes. The application may set a memory policy to be local or allocate cores from local memory of a NUMA node or adjacent NUMA nodes if an application requires memory policy as "interleave."

Once the instances are deployed, data may be loaded into the application instances for processing at step 540. Data may be loaded into each instance in parallel, based on CPU performance, to provide the data for processing more quickly. The data may be identified via files for loading into each instance.

For example, after estimating a database size, the database size is divided by a core count. The core count may be retrieved from step 520. A single load may be run, and a determination is made as to whether more than 85% of CPU usage is occurring. If not, the core count is reduced at step 535. Next, instances may be determined as the total core count divided by the determined core count. Data is then divided by the number of instances and a text file is created with a file name list for each core count at step 555. The text file is then input into the loading program. A localized database instance may then be allocated.

More details for deploying software in a multi-instance node are described in U.S. patent application Ser. No. 14/266,758, titled "Deploying Big Data Software in a Multi-Instance Node," filed Apr. 30, 2014, the disclosure of which is incorporated herein by reference.

Figure 6:
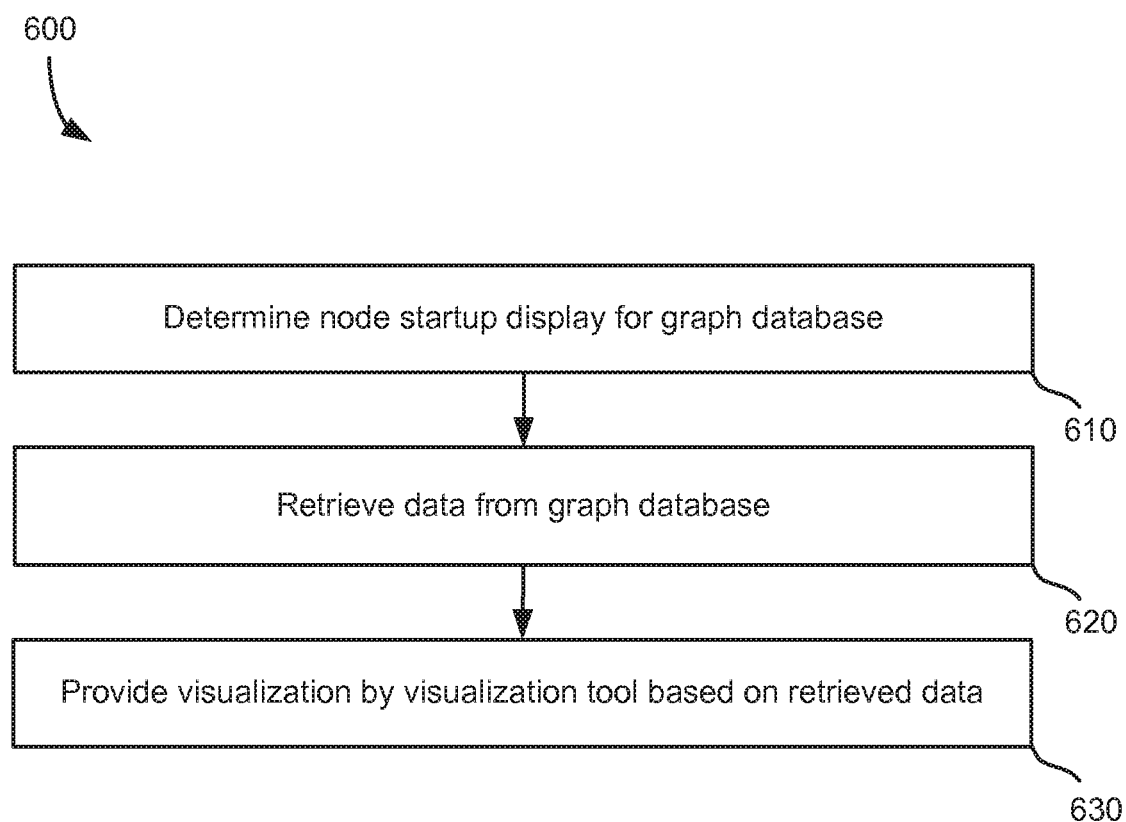
FIG. 6 is a block diagram for providing a visualization capability by a visualization tool based on retrieved data.

FIG. 6 is a block diagram for providing a visualization capability by a visualization tool based on retrieved data. First, a node start up display is determined for a graph database at step 610. A user may install and load the graph database software. The top node layer may be defined as the first node(s) that need to be displayed as soon as the graph is launched. If the graph has disconnected regions, the top nodes of the disconnected regions may be displayed. A query may be created using the database query language. In embodiments, all top display nodes may be returned in this query. A standard software programming model, such as for example a Keylines software programming model, may be used to display the top nodes.

Next, data is retrieved from the graph database at step 620. Retrieving data may include establishing a connection with a graph database, querying the graph database for the data, and then receiving and processing the stream of data received from the graph database by the adapter module.

To retrieve the data, a connect layer program may be implemented from the graph database to a visualization software. In embodiments, the query used within a J2EE program may be formatted to output a JSON conversion. For each node selection, the query and JSON conversion may be different. This can be done with one or more J2EE programs. The JSON conversion output must contain both the relationship and node value. It may contain properties if display is desired by a user. The connect layer will allow any graph database technology to connect to software such as Keylines visualization software.

A visualization capability is provided by the visualization tool based on the retrieved data at step 630. To provide the visualization, a hook to a graph database visualization tool may be created at step 130. A Keylines programming model may be used to hook the graph database visualization tool. JQuery or AJAX may be used to hook the JSON output from step 120 to Keylines. Javascript is recommended as the language to use for exterior Keylines web UI visualization.

More details for providing a visualization capability are described in U.S. patent application Ser. No. 14/266,656, titled "Software Design Pattern for Adapting a Graph Database Visualization," filed Apr. 30, 2014, the disclosure of which is hereby incorporated herein by reference.

Figure 7:
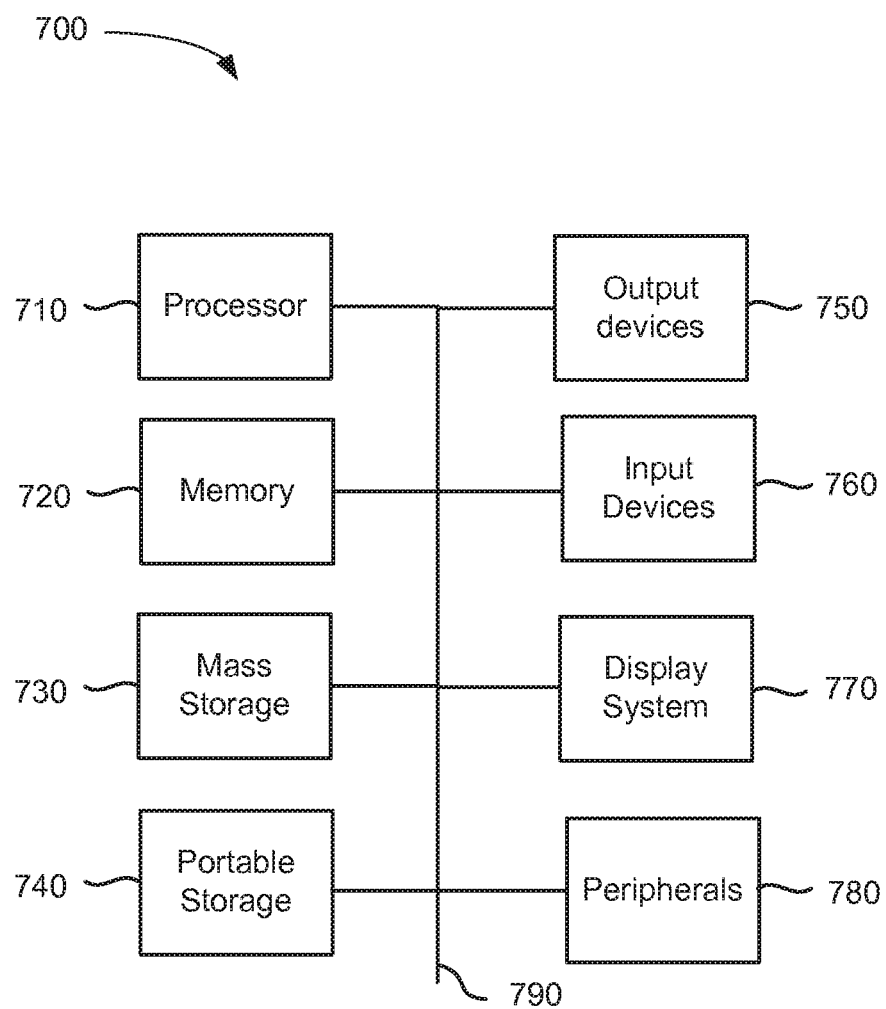
FIG. 7 is a block diagram of an exemplary computing device for implementing the present technology.

FIG. 7 illustrates an exemplary computing system 700 that may be used to implement all or a portion of a computing device for use with the present technology. For example, the computing system 700 may describe additional components for system 300 of FIG. 3 and a mobile device in communication with system 300. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. When implemented as a device such as a smart phone, the system 700 may include additional components such as one or more antennas, radios, microphones, an LED touch screen, and other components. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
a plurality of processors executing instructions on a large coherent shared memory many-core computer system to provide at least one of a database engine, a virtual machine layer, a graphics database or a middleware layer; and
executing one or more instances of an application program on the computing system by the plurality of processors, wherein:
the executing comprises at least one of maximizing of system performance, resource utilization, reduced latency, or scalability for end-user applications in a cloud, wherein:
each instance of the one or more instances of the application program is executed on a group of processors of the plurality of processors, and
the processors of each group of the groups are allocated from one or more sets of adjacent processing cores,
wherein each of the one or more sets of adjacent processing cores include processing cores from a single multi-core processor or from a plurality of processing sockets that access memory associated with a node when performing analytic computations according to the one or more instances of the application program, the method further comprising:
providing visualization data based on analytics by a visualization application, where the visualization is configured on a single step machine; and
configuring the instances to handle the analytics.

2. The method of claim 1, wherein the instances comprise instances of client applications, the method further comprising using the instances of the client applications to perform analytics on data stored in the computer system.

3. The method of claim 1, wherein the processors of each group are configured to include the database engine.

4. The method of claim 1, wherein the processors of each group are configured to comprise the virtual machine layer.

5. The method of claim 1, wherein the processors of each group are configured to comprise the graphics database.

6. The method of claim 1, wherein the processors of each group are configured to comprise the middleware layer and wherein the middleware layer is configured to comprise one or more of information management software and business intelligence application software.

7. The method of claim 1, wherein the application program is selected from a group consisting of visualization tools, business analytics software, and big data software.

8. A method comprising:
executing one or more instances of an application program on a large coherent shared memory many-core computing system by a plurality of processors, wherein:
the executing comprises at least one of maximizing of system performance, resource utilization, reduced latency, or scalability for end-user applications in a cloud,
each instance of the one or more instances of the application program is executed on a group of processors of the plurality of processors, and
the processors of each group of the groups are allocated from one or more sets of adjacent processing cores,
wherein each of the one or more sets of adjacent processing cores include processing cores from a single multi-core processor or from a plurality of processing sockets that access memory associated with a node when performing analytic computations according to the one or more instances of the application program, the method further comprising:

providing visualization data based on analytics by a visualization application, where the visualization is configured on a single step machine; and configuring the instances to handle the analytics.

9. The method of claim 8, wherein the instances comprise instances of client applications, the method further comprising using the instances of the client applications to perform analytics on data stored in the computer system.

10. The method of claim 8, wherein the processors of each group of the groups are configured to include a database engine.

11. The method of claim 8, wherein the processors of each group of the groups are configured to comprise a virtual machine layer.

12. The method of claim 8, wherein the processors of each group of the groups are configured to comprise a graphics database.

13. The method of claim 8, wherein the processors of each group of the groups are configured to comprise a middleware layer and wherein the middleware layer is configured to comprise one or more of information management software and business intelligence application software.

* * * * *